(12) United States Patent
Sato et al.

(10) Patent No.: US 10,052,713 B2
(45) Date of Patent: Aug. 21, 2018

(54) BONDING METHOD AND BONDED STRUCTURE

(71) Applicant: ULTEX CORPORATION, Fukuoka-shi, Fukuoka (JP)

(72) Inventors: Shigeru Sato, Fukuoka (JP); Ryoichi Ishii, Fukuoka (JP); Takahiro Ito, Fukuoka (JP); Mayumi Kouya, Fukuoka (JP)

(73) Assignee: ULTEX CORPORATION, Fukuoka-shi (JP)

( * ) Notice: Subject to any disclaimer, the term of this patent is extended or adjusted under 35 U.S.C. 154(b) by 22 days.

(21) Appl. No.: 15/238,789

(22) Filed: Aug. 17, 2016

(65) Prior Publication Data

US 2017/0050262 A1    Feb. 23, 2017

(30) Foreign Application Priority Data

Aug. 20, 2015   (JP) .................................. 2015-163236

(51) Int. Cl.
*B23K 1/06*   (2006.01)
*B23K 20/10*   (2006.01)
(Continued)

(52) U.S. Cl.
CPC ............ *B23K 20/10* (2013.01); *B23K 20/002* (2013.01); *B23K 20/227* (2013.01);
(Continued)

(58) Field of Classification Search
CPC ................ B23K 20/227; B23K 20/002; B23K 2201/42; B23K 2203/52; B23K 2203/172; B23K 2203/18; B23K 20/10–20/106
(Continued)

(56) References Cited

U.S. PATENT DOCUMENTS 3,962,007 A * 6/1976 Heimberger ............ B29C 65/08
156/219
4,364,783 A * 12/1982 Theodore ................ B29C 57/10
156/244.13
(Continued)

FOREIGN PATENT DOCUMENTS

EP           262699 A  *  4/1988
JP         63188483 A  *  8/1988
(Continued)

*Primary Examiner* — Kiley Stoner
(74) *Attorney, Agent, or Firm* — Sughrue Mion, PLLC; Richard C. Turner (57) ABSTRACT

A bonding target member 1 having a solid bonding material 3 with aluminum as a main component is interposed between a metal member 2 and a ceramic member 4 and an elastic member 12 are pressurized by a pressurizing section 13 and a bonding tool section 15 of a resonator 14 in a vertical direction. The bonding tool section 15 of the resonator 14 resonates with sound vibration or ultrasound vibration transmitted from an oscillator 16. An interfacial portion between the metal member 2 and the bonding material 3 with aluminum as a main component and an interfacial portion between the bonding material 3 with aluminum as a main component and the ceramic member 4 each receive pressurization and vibration energy to be bonded together. The metal member 2 and the ceramic member 4 can be bonded together at ordinary temperature in the atmosphere with the bonding material 3 with aluminum as a main component. When the ceramic member 4 has a thickness resistant to pressurization and vibration energy at the time of bonding to resist crack, the elastic member 12 may be disposed on a metal member 2 side, or may not be used.

8 Claims, 6 Drawing Sheets

(51) Int. Cl.
*B23K 20/00* (2006.01)
*B23K 20/227* (2006.01)
*B23K 103/16* (2006.01)
*B23K 103/18* (2006.01)
*B23K 103/00* (2006.01)
*B23K 101/42* (2006.01)

(52) U.S. Cl.
CPC .... *B23K 2201/42* (2013.01); *B23K 2203/172* (2015.10); *B23K 2203/18* (2013.01); *B23K 2203/52* (2015.10)

(58) Field of Classification Search
USPC ............... 228/110.1, 1.1; 156/73.1–73.4, 156/580.1–580.2
See application file for complete search history.

(56) References Cited

U.S. PATENT DOCUMENTS

| | | | | |
|---|---|---|---|---|
| 4,782,209 A | * | 11/1988 | Caers | C03C 27/046 219/121.64 |
| 4,784,710 A | * | 11/1988 | Abe | B29C 63/04 156/580.1 |
| 4,886,695 A | * | 12/1989 | Mizuno | C04B 37/021 403/273 |
| 5,144,885 A | * | 9/1992 | Suzuki | C04B 37/021 92/213 |
| 5,153,449 A | * | 10/1992 | Crook | H01L 23/492 174/16.2 |
| 5,270,135 A | * | 12/1993 | O'Neil-Bell et al. | B23K 20/10 29/623.2 |
| 5,279,900 A | * | 1/1994 | Takeuchi | F16F 15/1442 428/462 |
| 5,584,122 A | * | 12/1996 | Kato | H01R 13/5216 174/84 R |
| 6,530,653 B2 | * | 3/2003 | Le | B23K 1/06 347/71 |
| 6,922,895 B1 | * | 8/2005 | Whitworth | B21F 33/04 29/33 F |
| 9,818,716 B2 | * | 11/2017 | Fujino | H01L 24/45 |
| 2002/0006765 A1 | * | 1/2002 | Michel | B23K 26/073 451/28 |
| 2002/0060724 A1 | * | 5/2002 | Le | B23K 1/06 347/71 |
| 2009/0020589 A1 | * | 1/2009 | Yan | B23K 1/06 228/111.5 |
| 2016/0336099 A1 | * | 11/2016 | Nagase | H01C 1/084 |

FOREIGN PATENT DOCUMENTS

| | | | | |
|---|---|---|---|---|
| JP | 02133184 A | * | 5/1990 | |
| JP | 2000232189 A | * | 8/2000 | |
| JP | 3456921 B2 | * | 10/2003 | |
| WO | WO 2008071720 A1 | * | 6/2008 | ............... B22F 7/06 |

* cited by examiner

BONDING METHOD AND BONDED STRUCTURE

TECHNICAL FIELD OF THE INVENTION

The present invention relates to a bonding method for bonding a ceramic member and a metal member together at ordinary temperatures in the atmosphere.

BACKGROUND OF THE INVENTION

A DBC substrate obtained by bonding a copper plate to a ceramic substrate by using a subtle amount of oxide contained in the copper plate to generate an eutectic liquid phase of a copper oxide for use as a bonding material with respect to the ceramic substrate and an AMC (Active Metal Brazed Copper) substrate with a brazing member obtained by adding an active metal such as Ti or Zr being interposed as an intermediate material are disclosed on p. 1046, Ceramics 41 (2006), No. 12, "Aluminum nitride substrates for semiconductor devices" (http://www.ceramic.or.jp/museum/contents/pdf/2006_12_03.pdf).

However, as disclosed in the above document, these methods of bonding a metal to a ceramic member such as a ceramic substrate are complex, using an eutectic reaction of a copper oxide or using a brazing member with the addition of an active metal.

SUMMARY OF THE INVENTION

The present invention was made in view of the background art described above, and is to provide a bonding method of bonding a ceramic member and a metal member together.

In the bonding method of the present invention, a resonator resonates with sound vibration or ultrasound vibration transmitted from an oscillator attached to one end of the resonator to vibrate in a lateral direction orthogonal to a pressured direction. With this, a metal member and a ceramic member are bonded together with a bonding material with aluminum as a main component or a bonding material with tin as a main component.

In the present invention, by receiving pressurization and vibration energy, the bonding material with aluminum as a main component bonds the metal member and the ceramic member together. Therefore, the metal member and the ceramic member are bonded together at ordinary temperatures in the atmosphere within a short period of time without distortion or residual stress, thereby improving quality.

DESCRIPTIONS OF THE PREFERRED EMBODIMENTS

Figure 1:
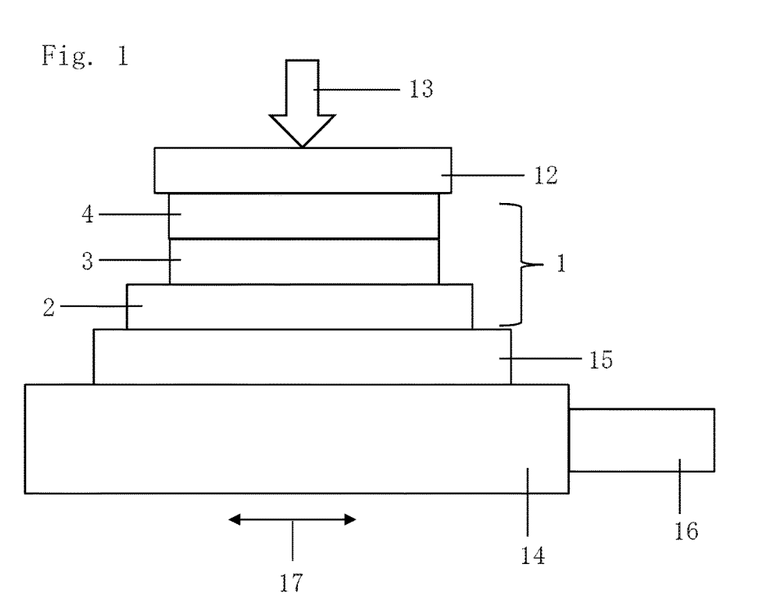
FIG. 1 is a front view depicting a bonding method according to a first embodiment of the present invention.

A bonding target member 1 for use in a bonding method according to a first embodiment of the present invention depicted in FIG. 1 is in a laminated shape having a metal member 2, a bonding material 3 with aluminum as a main component, and a ceramic member 4 laminated together. The metal member 2 is exemplarily configured to be a solid made of copper in a sheet shape, a foil shape, a film shape, a plate shape, or a block. The bonding material 3 with aluminum as a main component is exemplarily configured to be a solid in a sheet shape, a foil shape, a film shape, a plate shape, or a leaf shape. The ceramic member 4 is exemplarily configured to be a solid in a sheet shape, a foil shape, a film shape, a plate shape, or a block.

The bonding method according to the first embodiment of the present invention depicted in FIG. 1, in a state at ordinary temperatures in the atmosphere, the metal member 2 of the bonding target member 1 is put on a bonding tool section 15 of a resonator 14. A resin pad 12 disposed on the bonding target member 1 is pressurized downward by a pressurizing section 13. The bonding target member 1 and the resin pad 12 are pressurized by the pressurizing section 13 and the bonding tool section 15 in a vertical direction. The bonding tool section 15 resonates with sound vibration or ultrasound vibration transmitted from an oscillator 16 coupled to one end of the resonator 14 to vibrate in a lateral direction indicated by an arrow 17. With this, an interfacial portion between the metal member 2 and the bonding material 3 with aluminium as a main component and an interfacial portion between the bonding material 3 with aluminium as a main component and the ceramic member 4 each receive pressurization and vibration energy to be bonded together. Therefore, the metal member 2 and the ceramic member 4 are bonded together at ordinary temperatures in the atmosphere within a short period of time without distortion or residual stress, thereby improving quality.

As described above, with sound vibration, the block-shaped ceramic member 4 and the thick metal member 2 can be bonded together. Therefore, not only bonding of an electric conductor but also bonding of a three-dimensional mechanical structure can be made. Also, with the resin pad 12 disposed between the ceramic member 4 and the pressurizing section 13, a crack of the ceramic member 4 can be prevented even if the thickness of the ceramic member 4 is thin. Furthermore, large-area bonding, which cannot be made by ultrasonic bonding, can be made by sonic bonding. Still further, appropriate bonding can be made even if a ceramic circuit substrate internally or externally provided with an electrical circuit is used as a ceramic member, After the metal member 2 and the ceramic member 4 are bonded together with the bonding material 3 with aluminum as a main component, pressurization by the pressurizing section 13 stops, and this stop state is kept for approximately 0.1 to several seconds. Then, pressurization by the pressurizing section 13 and the resonator 14 in the vertical direction is released, the bonding target member 1 becoming a metal bonded structure and the resin pad 12 are extracted between the pressurizing section 13 and the resonator 14, the bonding target member 1 and the resin pad 12 are separated from each other, and one bonding operation for the bonding target member 1 now ends.

As the metal member 2, a metal member other than copper may be applied. As the ceramic member 4, $Si_3N_4$ (silicon nitride), $Al_2O_3$ (aluminum oxide), and other ceramic members can be applied.

The resin pad 12 is configured to be made of Teflon (registered trademark), silicon, or the like in a sheet shape, a foil shape, a film shape, or a plate shape. As the resin pad 12, a synthetic resin or elastomer other than Teflon (registered trademark) and silicon can be applied as long as the resin pad 12 is resistant to heat at the time of bonding. The resin pad 12 can be applied as configured to be separated from the bonding target member 1 and the pressurizing section 13 or be fixed to either one or both of the bonding target member 1 and the pressurizing section 13.

The bonding method depicted in FIG. 1 was used to conduct an experiment with sound vibration fixed to a certain frequency in a range from 10 kHz to 20 kHz to study the bonded bonding target member 1. As a result, it was confirmed as follows, for example: warpage and distortion of the bonding target member 1 due to heat are small; the thickness of the bonding material 3 with aluminum as a main component is several μm to several mm; as the metal member 2, aluminum, copper, gold, silver, and nickel can be used; the bonding time is as short as several seconds; the load on the bonding target member 1 can also be decreased; and bonding of the bonding material 3 with aluminum as a main component by sound vibration at ordinarily temperature in the atmosphere can be made within seconds. Also, it was confirmed that the load on the bonding target member 1 can also be decreased and, as a result, the occurrence of residual stress can also be prevented. Furthermore, in the case of the bonding material 3 made of aluminum, it was confirmed that the melting temperature after bonding is equal to or higher than approximately 660° C., which is equal to the melting temperature of aluminum, and the bonding material 3 has bondability with various metal members 2 and various ceramic members 4.

In place of the bonding material 3 with aluminum as a main component, a bonding material with tin as a main component not depicted was interposed between the metal member 2 and the ceramic member 4. By using the resin pad 12, pressurization was performed by the pressurizing section 13 and the bonding tool section 15 in the vertical direction, and the bonding tool section 15 resonated with sound vibration or ultrasound vibration transmitted from the oscillator 16 coupled to one end of the resonator 14 to vibrate in the lateral direction indicated by the arrow 17. With this, an interfacial portion between the metal member 2 and the bonding material with tin as a main component and an interfacial portion between the bonding material with tin as a main component and the ceramic member 4 each received pressurization and vibration energy to be bonded together. As is the case when the metal member 2 and the ceramic member 4 are bonded together with the bonding material 3 with aluminum as a main component, it was confirmed that the metal member 2 and the ceramic member 4 are bonded together at ordinary temperatures in the atmosphere within a short period of time without distortion or residual stress, thereby improving quality.

Also, without the bonding material 3 with aluminum as a main component or the bonding material as tin as a main component being interposed between the metal member 2 and the ceramic member 4, the resin pad 12 was used, pressurization was performed by the pressurizing section 13 and the bonding tool section 15 in the vertical direction, and the bonding tool section 15 resonated with sound vibration or ultrasound vibration transmitted from the oscillator 16 coupled to one end of the resonator 14 to vibrate in the lateral direction indicated by the arrow 17. With this, it was confirmed that bonding of the metal member 2 and the ceramic member 4 can be made.

Figure 2:
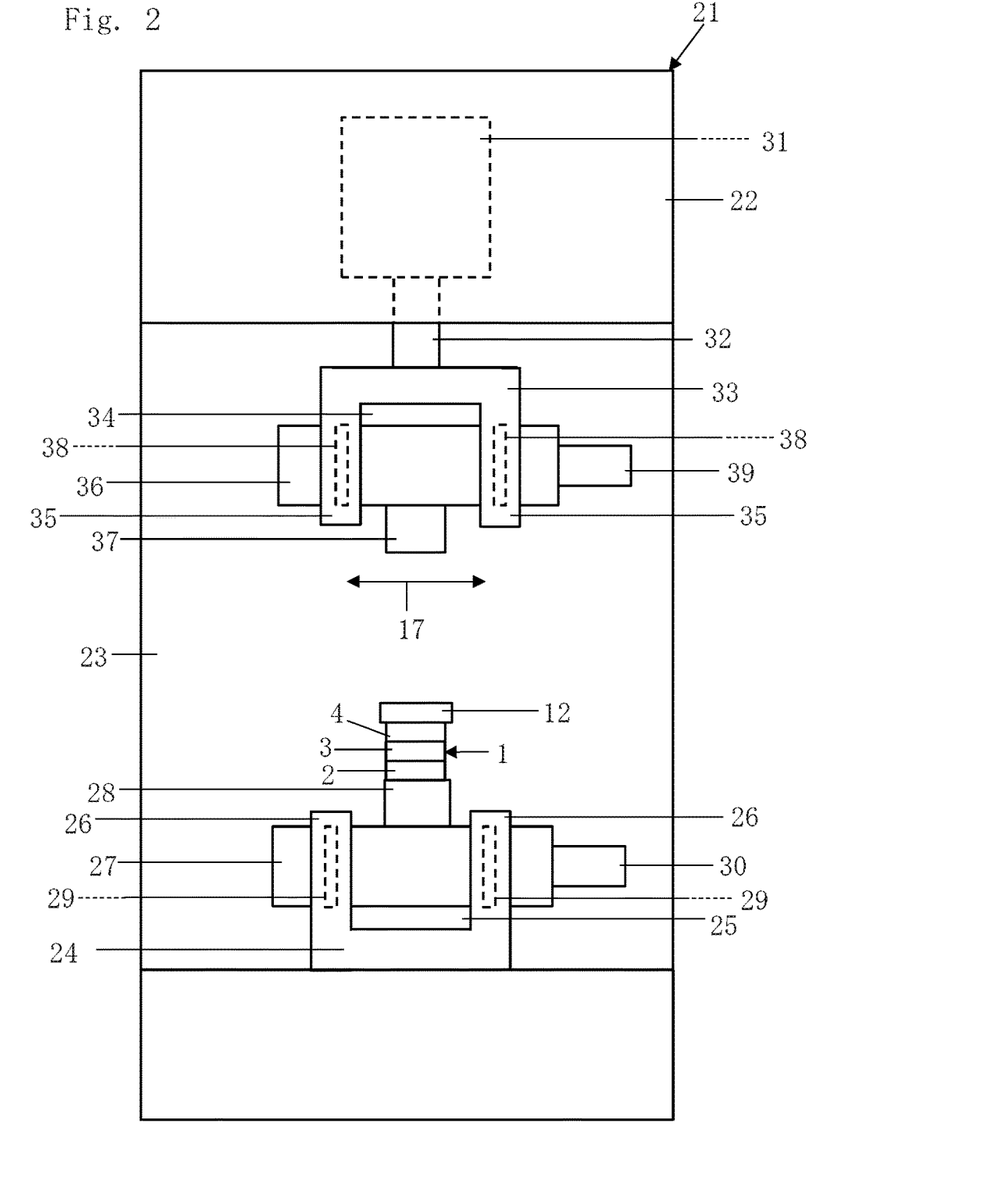
FIG. 2 is a front view depicting a bonding apparatus according to a second embodiment of the present invention.
Figure 3:
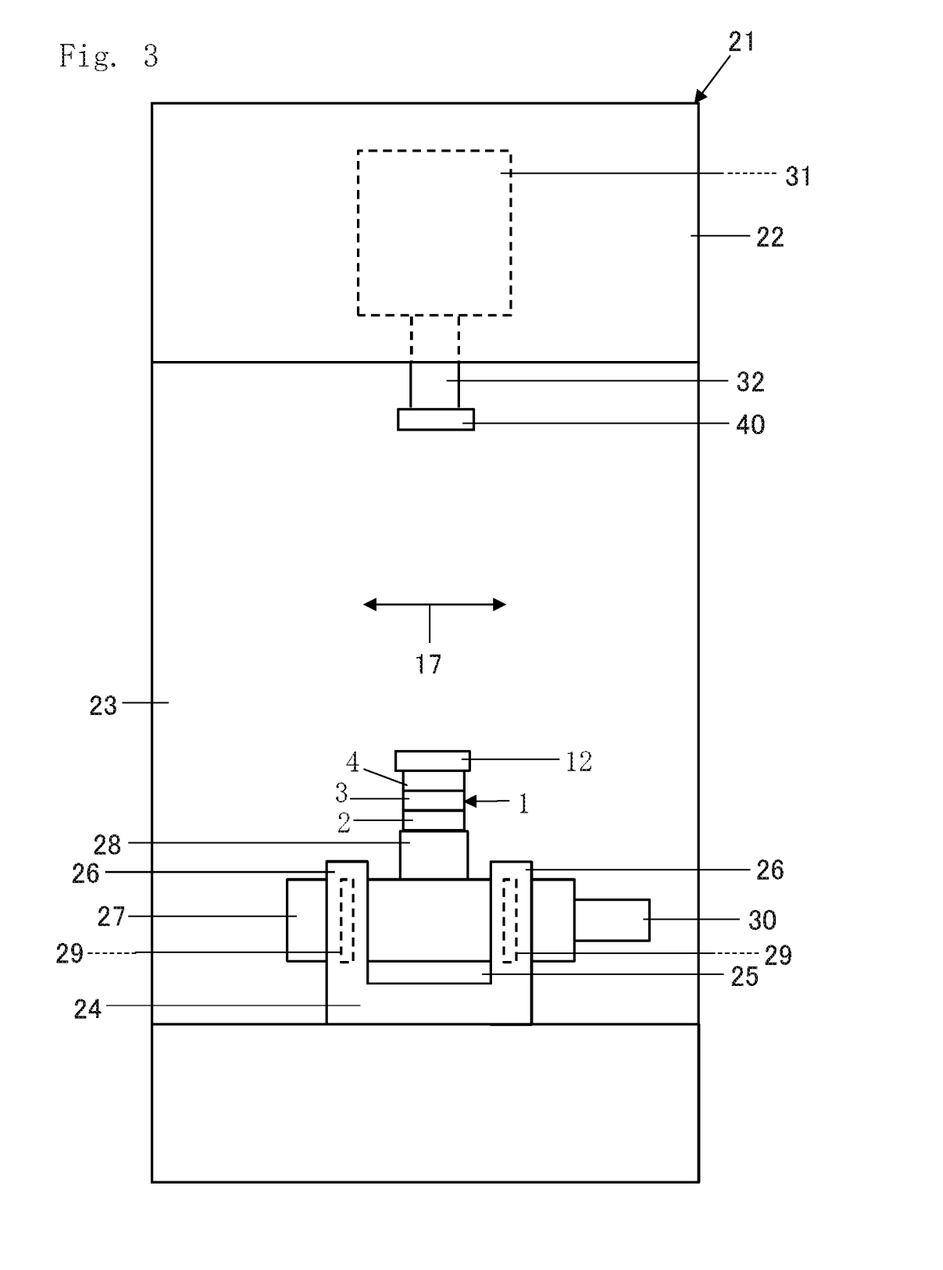
FIG. 3 is a front view depicting a bonding apparatus according to a third embodiment of the present invention.
Figure 4:
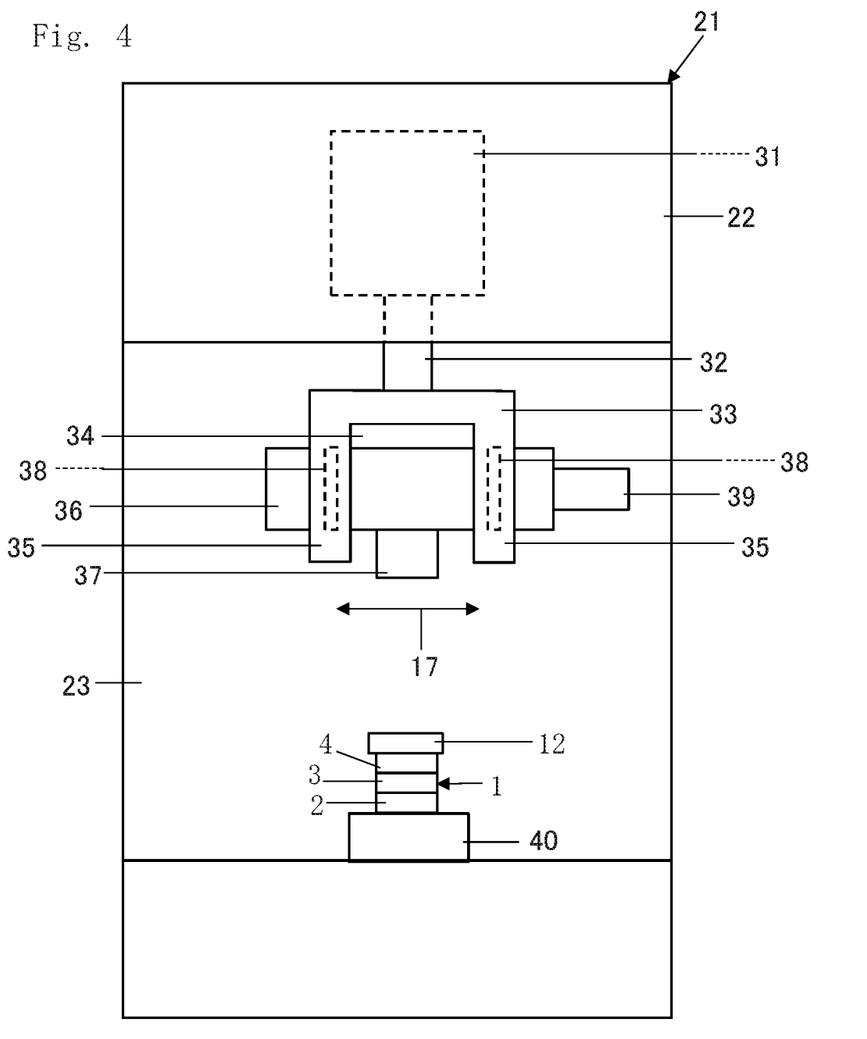
FIG. 4 is a front view depicting a bonding apparatus according to a fourth embodiment of the present invention.

Next, with reference to FIG. 2 to FIG. 4, bonding apparatuses 21 according to second to fourth embodiments of the present invention for use in the bonding method depicted in FIG. 1 are described.

The bonding apparatus 21 according to the second embodiment of the present invention depicted in FIG. 2 has an apparatus framework section 22 provided with a work space section 23. Below the work space section 23 of the apparatus framework section 22, a support 24 is provided. The support 24 includes a support section 26 on both of left and right sides of a support space section 25 penetrating through forward, backward, and upward. In the support 24, a resonator 27 is set. The resonator 27 is configured to include a bonding tool section 28 and a supported section 29. The resonator 27 is formed in a linear rod shape having a length from one end to the other end being at least one wavelength of a resonance frequency of sound vibration or ultrasound vibration transmitted from an oscillator 30. At both ends and a center of the resonator 27 in a length direction, maximum vibration amplitude points are positioned. The bonding tool section 28 is provided on an outer surface section where the maximum vibration amplitude point at the center of the resonator 27 in the length direction is positioned.

The bonding tool section 28 can be applied as being provided to protrude from an outer side surface of the resonator 27, being provided to the outer side surface of the resonator 27, or being provided to be recessed from the outer side surface of the resonator 27. The supported section 29 is provided on an outer surface section positioned at minimum vibration amplitude points present on both sides of the resonator 27 in the length direction from the bonding tool section 28.

The oscillator 30 is attached to one end of the resonator 27. It is applicable that a booster not depicted is provided between the resonator 27 and the oscillator 30. In the support 24, the length direction of the resonator 27 is oriented to the lateral direction indicated by the arrow 17, a portion of the resonator 27 other than the supported section 29 is disposed in the support space section 25 so as not to make contact with the support 24, and the supported section 29 is supported by the support section 26. With this, the resonator 27 is set to the support 24.

Above the work space section 23 of the apparatus framework section 22, a pressurizing mechanism 31 is provided. The pressurizing mechanism 31 has an output member 32 disposed in the work space section 23 from above the apparatus framework section 22. A lower portion of the output member 32 disposed in the work space section 23 linearly ascends and descends inside the work space section 23 by driving of the pressurizing mechanism 31. A support 33 is provided to the lower portion of the output member 32 disposed in the work space section 23.

The support 33 is configured to include a support section 35 on both left and right sides of a support space section 34 penetrating through forward, backward, and downward. In the support 33, a resonator 36 is set. The resonator 36 includes a bonding tool section 37 and a supported section 38. The resonator 36 is formed in a linear rod shape having a length from one end to the other end being at least one wavelength of a resonance frequency of sound vibration or ultrasound vibration transmitted from an oscillator 39. At both ends and a center of the resonator 36 in a length direction, maximum vibration amplitude points are positioned. The bonding tool section 37 is provided on an outer surface section where the maximum vibration amplitude point at the center of the resonator 36 in the length direction is positioned. The bonding tool section 37 can be applied as being provided to protrude from an outer surface of the resonator 36, being provided to the outer surface of the resonator 36, or being provided to be recessed from the outer surface of the resonator 36. The supported section 38 is provided on an outer surface section positioned at minimum vibration amplitude points present on both sides of the resonator 36 in the length direction from the bonding tool section 37.

The oscillator 39 is attached to one end of the resonator 36. It is applicable that a booster not depicted is provided between the resonator 36 and the oscillator 39. In the support 33, the length direction of the resonator 36 is oriented to the lateral direction indicated by the arrow 17, a portion of the resonator 36 other than the supported section 38 is disposed in the support space section 34 so as not to make contact with the support 33, and the supported section 38 is supported by the support section 35. With this, the resonator 36 is set to the support 33.

In the bonding apparatus 21 according to the second embodiment of the present invention depicted in FIG. 2, the pressurizing mechanism 31, the output member 32, the support 33, the support space section 34, the support section 35, the resonator 36, the bonding tool section 37, the supported section 38, and the oscillator 39 correspond to the pressurizing section 13 depicted in FIG. 1, the resonator 27 corresponds to the resonator 14 depicted in FIG. 1, the bonding tool section 28 corresponds to the bonding tool section 15 depicted in FIG. 1, and the oscillator 30 corresponds to the oscillator 16 depicted in FIG. 1.

A bonding method of bonding the bonding target member 1 depicted in FIG. 1 by the bonding apparatus 21 depicted in FIG. 2 is described. First, the output member 32 stops at an ascending position, and the bonding tool sections 28 and 37 form a space in which a laminated object formed of the bonding target member 1 and the resin pad 12 is insertable and are opposed to each other in the vertical direction. In this state, after the laminated object formed of the bonding target member 1 and the resin pad 12 is mounted on the lower bonding tool section 28, the pressurizing mechanism 31 is driven. In accordance with a descent of the output member 32, the bonding target member 1 and the resin pad 12 are vertically interposed and pressurized between the bonding tool section 28 and the bonding tool section 37.

Then, with the oscillators 30 and 39 performing simultaneous oscillation, overlap oscillation, or relay oscillation, or with either one of the oscillators 30 and 39 oscillating, the resonator 27 resonates with sound vibration or ultrasound vibration transmitted from the oscillator 30, the bonding tool section 28 resonates with vibration transmitted from the resonator 27, the resonator 36 resonates with sound vibration or ultrasound vibration transmitted from the oscillator 39, and the bonding tool section 37 resonates with vibration transmitted from the resonator 36. In simultaneous oscillation of the oscillators 30 and 39, the oscillators 30 and 39 oscillate at the same time. In overlap oscillation of the oscillators 30 and 39, part of oscillation of the oscillator 30 and part of oscillation of the oscillator 39 overlap each other. In relay oscillation of the oscillators 30 and 39, oscillation of the oscillator 30 and oscillation of the oscillator 39 do not overlap each other but either one of oscillations is relayed to the other.

In the bonding method depicted in FIG. 1, the bonding target member 1 and the resin pad 12 depicted in FIG. 2 are vertically interposed and pressurized between the bonding tool section 28 and the bonding tool section 37, and the oscillator 39 depicted in FIG. 2 does not oscillate but only the oscillator 30 depicted in FIG. 2 oscillates to cause the metal member 2 and the ceramic member 4 to be bonded together with the bonding material 3 with aluminum as a main component depicted in FIG. 1. Then, the pressurizing mechanism 31 depicted in FIG. 2 is driven. In accordance with an ascent of the output member 32, the bonding tool section 37 goes away from the resin pad 12, and the resin pad 12 and the bonding target member 1 as a bonding structure are left on the bonding tool section 28. The resin pad 12 and the bonding target member 1 left on the bonding tool section 28 are extracted from the bonding tool section 28, the resin pad 12 and the bonding target member 1 are separated from each other, and then one bonding operation on the bonding target member 1 by the bonding apparatus 21 now ends.

The bonding apparatus 21 according to a third embodiment of the present invention depicted in FIG. 3 is described. In the bonding apparatus 21 depicted in FIG. 3, a receiving section 40 is provided to a lower portion of the pressurizing mechanism 31 disposed in the work space section 23. The pressurizing mechanism 31, the output member 32, and the receiving section 40 correspond to the pressurizing section 13 depicted in FIG. 1. The support 24, the support space section 25, the support section 26, the resonator 27, the bonding tool section 28, the supported section 29, and the oscillator 30 are provided below the work space section 23 of the apparatus framework section 22. The resonator 27, the bonding tool section 28, and the oscillator 30 depicted in FIG. 3 correspond to the resonator 14, the bonding tool section 15, and the oscillator 16, respectively, depicted in FIG. 1.

A bonding method using the bonding apparatus 21 depicted in FIG. 3 is described. First, the output member 32 stops at an ascending position, and the bonding tool section 28 and the receiving section 40 form a space in which a laminated object formed of the bonding target member 1 and the resin pad 12 is insertable and are opposed to each other in the vertical direction. In this state, after the laminated object formed of the bonding target member 1 and the resin pad 12 is mounted on the bonding tool section 28, the pressurizing mechanism 31 is driven. In accordance with a descent of the output member 32, the bonding target member 1 and the resin pad 12 are vertically interposed and pressurized between the bonding tool section 28 and the receiving section 40. The resonator 27 resonates with sound vibration or ultrasound vibration transmitted from the oscillator 30. The bonding tool section 28 vibrates in the lateral direction indicated by the arrow 17. The metal member 2, the bonding material 3 with aluminum as a main component, and the ceramic member 4 in the bonding target member 1 receive the pressurization and vibration energy by the vibration in the lateral direction to be bonded together.

Then, the pressurizing mechanism 31 is driven. In accordance with an ascent of the output member 32, the receiving section 40 goes away from the resin pad 12, and the resin pad 12 and the bonding target member 1 as a bonding structure are left on the bonding tool section 28. The resin pad 12 and the bonding target member 1 left on the bonding tool section 28 are extracted from the bonding tool section 28, the resin pad 12 and the bonding target member 1 are separated from each other, and one bonding operation on the bonding target member 1 by the bonding apparatus 21 now ends.

The bonding apparatus 21 according to a fourth embodiment of the present invention depicted in FIG. 4 is described. The bonding apparatus 21 depicted in FIG. 4 is provided with the support 33, the support space section 34, the support section 35, the resonator 36, the bonding tool section 37, the supported section 38, and the oscillator 39 are provided to a lower portion of the pressurizing mechanism 31 disposed in the work space section 23. Below the work space section 23 of the apparatus framework section 22, the receiving section 40 is provided. The resonator 36, the bonding tool section 37, and the oscillator 39 depicted in FIG. 4 correspond to the resonator 14, the bonding tool section 15, and the oscillator 16 depicted in FIG. 1, although the positions of the former in the vertical direction are different from those of the latter. The pressurizing mechanism 31 and the output member 32 depicted in FIG. 4 correspond to the pressurizing section 13 depicted in FIG. 1.

A bonding method using the bonding apparatus 21 depicted in FIG. 4 is described. First, the output member 32 stops at an ascending position, and the bonding tool section 37 and the receiving section 40 form a space in which a laminated object formed of the bonding target member 1 and the resin pad 12 is insertable and are opposed to each other in the vertical direction. In this state, after the laminated objected formed of the bonding target member 1 and the resin pad 12 is mounted on the receiving section 40, the pressurizing mechanism 31 is driven. In accordance with a descent of the output member 32, the bonding target member 1 and the resin pad 12 are vertically interposed and pressurized between the bonding tool section 37 and the receiving section 40. The resonator 36 resonates with sound vibration or ultrasound vibration transmitted from the oscillator 39. The bonding tool section 37 vibrates in the lateral direction indicated by the arrow 17. The plurality of metal members in the bonding target member 1 receive the pressurization and vibration energy by the vibration in the lateral direction to be bonded together.

Then, the pressurizing mechanism 31 is driven. In accordance with an ascent of the output member 32, the bonding tool section 37 goes away from the resin pad 12, and the resin pad 12 and the bonding target member 1 as a bonding structure are left on the receiving section 40. The resin pad 12 and the bonding target member 1 left on the receiving section 40 are extracted from the receiving section 40, the resin pad 12 and the bonding target member 1 are separated from each other, and one bonding operation on the bonding target member 1 by the bonding apparatus 21 now ends.

FIG. 1 to FIG. 4 described above exemplarily depict the embodiments in which the bonding material 3 with aluminum as a main component is laminated on the metal member 2 as a bonding target member 1 and the ceramic member 4 is laminated on the bonding material 3 with aluminum as a main component. Alternatively, an embodiment can be applied in which the bonding material 3 with aluminum as a main component is laminated on the ceramic member 4 and the metal member 2 is laminated on the bonding material 3 with aluminum as a main component.

FIG. 1 to FIG. 4 described above exemplarily depict the embodiments in which the resin pad 12 is disposed on a ceramic member 4 side. Alternatively, when the ceramic member 4 has a thickness resistant to pressurization and vibration energy at the time of bonding to resist crack, an embodiment can be applied in which the resin pad 12 is disposed on a metal member 2 side or the resin pad 12 is not used.

Figure 5:
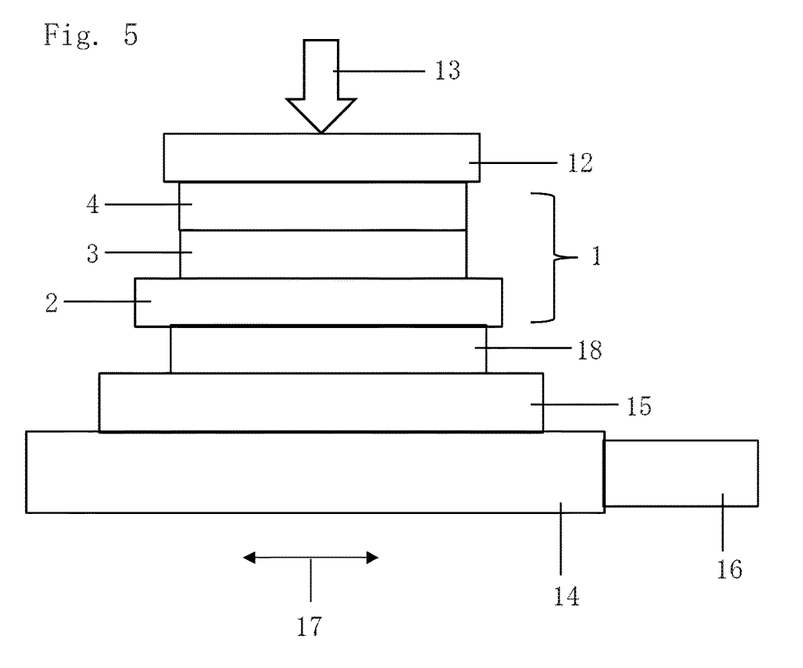
FIG. 5 is a front view depicting a bonding method according to a fifth embodiment of the present invention.

FIG. 1 to FIG. 4 described above exemplarily depict the embodiments in which the resin pad 12 is disposed on the bonding target member 1. Alternatively, an embodiment as depicted in FIG. 5 can be applied in which resin pads 12 and 18 are disposed above and below the bonding target member 1, respectively. The resin pad 18 may be configured of the same material as or a different material from that of the resin pad 12. Also, although not depicted, the resin pad 12 may be disposed not between the bonding target member 1 and the pressurizing section 13 but between the bonding target member 1 and the bonding tool section 15. That is, in an applicable embodiment, the resin pad 12 is at least either one or both of above and below the bonding target member 1 in the vertical direction.

Figure 6:
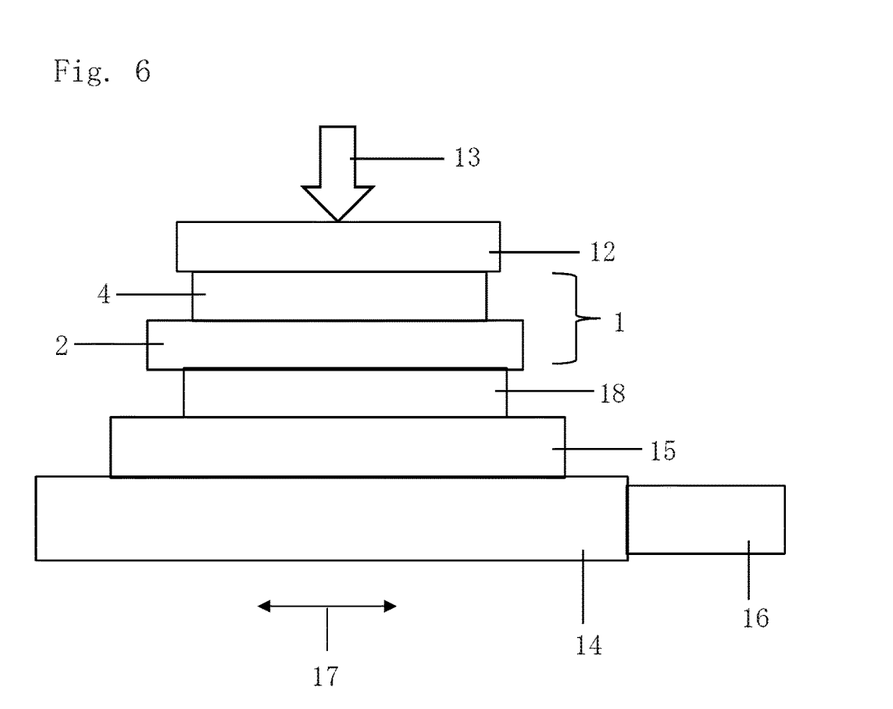
FIG. 6 is a front view depicting a bonding method according to a sixth embodiment of the present invention.

FIG. 1 to FIG. 4 described above exemplarily depict the embodiments in which the bonding target member 1 is configured in a laminated shape with the metal member 2, the bonding material 3 with aluminum as a main component, and the ceramic member 4 laminated together. Alternatively, as well as the embodiments depicted in FIG. 1 to FIG. 4, an embodiment as depicted in FIG. 6 can be applied in which the bonding target member 1 is configured in a laminated shape with the metal member 2 and the ceramic member 4 laminated together. Also in the embodiment depicted in FIG. 6, the resin pad 12 is at least either one or both of above and below the bonding target member 1 in the vertical direction. In FIG. 6, it can be thought that the metal member 2 is configured of an aluminum sheet and the ceramic member 4 is configured of aluminum oxide.

What is claimed is:

1. A bonding method for a bonding target member in a laminated shape, the bonding method comprising:
    forming the bonding target member by interposing a bonding material having a solid state and a main component of one of aluminum and tin, between a metal member and a ceramic member contacting a resin pad;
    applying a pressure directly from a pressurization tool section to the resin pad in a direction vertical to a major surface of the bonding target member; and
    bonding the metal member and ceramic member with the bonding material by vibrating the bonding target member by a resonator in a direction orthogonal to the vertical direction with one of sound vibration and ultrasound vibration transmitted from an oscillator attached to one end of the resonator.

2. A bonding method for a bonding target member in a laminated shape, the bonding method comprising:
    forming the bonding target member by interposing a bonding material having a solid state and a main component of one of aluminum and tin, between a metal member and a ceramic member contacting a first resin pad, a second resin pad is disposed below the metal member;
    applying a pressure directly from a pressurization tool section to the first resin pad in a direction vertical to a major surface of the bonding target member; and
    bonding the metal member and ceramic member with the bonding material by vibrating the bonding target member by a resonator in a direction orthogonal to the vertical direction with one of sound vibration and ultrasound vibration transmitted from an oscillator attached to one end of the resonator.

3. The bonding method according to claim 1, wherein the metal member is configured to be a solid made of copper in one of a sheet shape, a foil shape, a film shape, a plate shape, and a block.

4. The bonding method according to claim 1, wherein the ceramic member is configured to be a solid in one of a sheet shape, a foil shape, a film shape, a plate shape, and a block.

5. The bonding method according to claim 1, wherein the bonding material is configured to be in one of a sheet shape, a foil shape, a film shape, and a plate shape.

6. The bonding method according to claim 2, wherein the metal member is configured to be a solid made of copper in one of a sheet shape, a foil shape, a film shape, a plate shape, and a block.

7. The bonding method according to claim 2, wherein the ceramic member is configured to be a solid in one of a sheet shape, a foil shape, a film shape, a plate shape, and a block.

8. The bonding method according to claim 2, wherein the bonding material is configured to be in one of a sheet shape, a foil shape, a film shape, and a plate shape, or a leaf shape.

* * * * *